United States Patent

[11] 3,552,276

| [72] | Inventor | Joseph H. Morrow |
| | | 1268 Daniel St., Clarksville, Tenn. 37040 |
| [21] | Appl. No. | 759,701 |
| [22] | Filed | Sept. 13, 1968 |
| [45] | Patented | Jan. 5, 1971 |

[54] EXPANDABLE CYLINDRICAL PISTON
9 Claims, 4 Drawing Figs.

[52] U.S. Cl.................................................. 92/193,
92/195, 92/198, 92/200
[51] Int. Cl............................................... F16j 1/06
[50] Field of Search........................................ 92/193,
195, 198, 200

[56] References Cited
UNITED STATES PATENTS

| 1,402,679 | 1/1922 | Somes et al.................. | 92/195 |
| 1,655,177 | 1/1928 | Brockmeyer................. | 92/195 |
| 1,683,380 | 9/1928 | Brockmeyer................. | 92/195 |
| 1,750,928 | 3/1930 | Galloway..................... | 92/195X |
| 2,201,085 | 5/1940 | Girard......................... | 92/198 |

Primary Examiner—Martin P. Schwadron
Assistant Examiner—Robert R. Bunevich
Attorneys—Clarence A. O'Brien and Harvey B. Jacobson ABSTRACT: A cylindrical piston constructed to compensate for the relative wear between the cylinder wall and the piston. The piston is comprised of four arcuate segments with a top insert with the four segments being urged outwardly by a spring steel cylinder mounted on the inner circumference of the four arcuate segments.

PATENTED JAN 5 1971 3,552,276
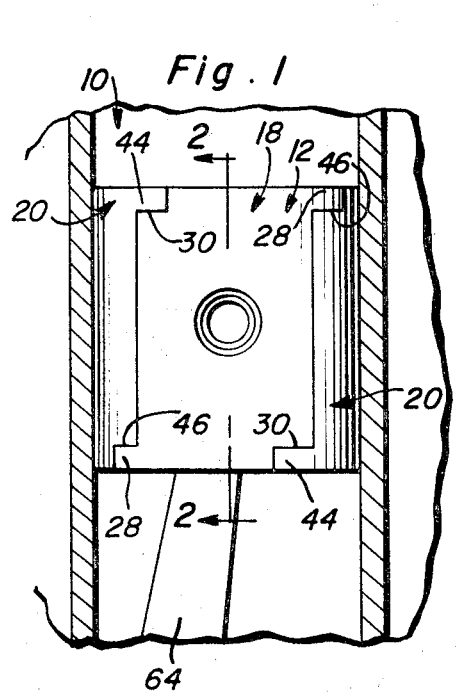
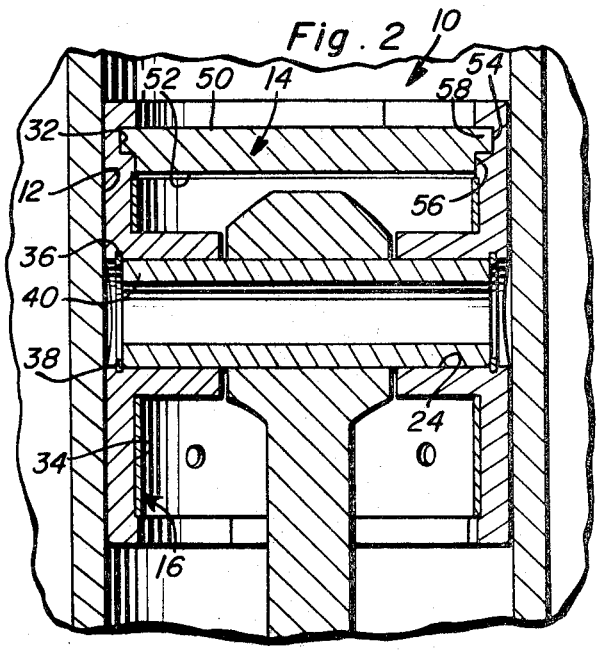
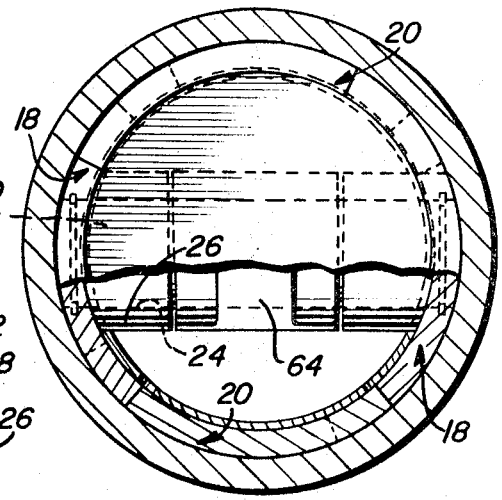
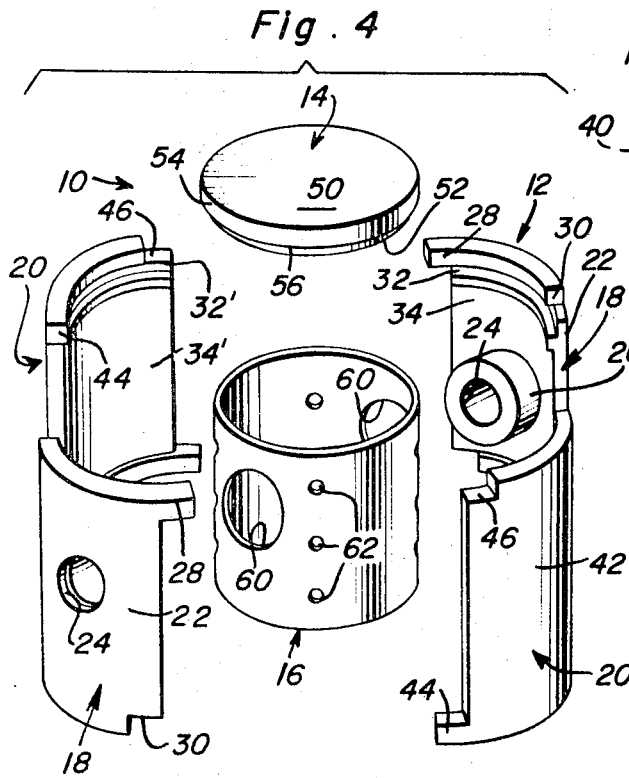
Joseph H. Morrow
INVENTOR.

EXPANDABLE CYLINDRICAL PISTON

In machines using pistons sliding in cylinders one of the most critical problems is the wear of the piston wall and the cylinder wall thereby enlarging the gap or tolerances therebetween. As this situation increases in severity the problems arising similarly increase with resultant loss in compression, piston slap occurs which could fatigue the metals of the cylinder or piston wall, and the motion permitted by the wearing piston and cylinder will cause resultant wear in the piston pin also. When this situation has occurred the remedy therefor is the expensive dismantling of the machine and the insertion of oversize pistons, or the more complete remedy of reboring the cylinder to true the walls thereof and the insertion of proper oversize pistons. Both of these remedies whether they be the shortcut insertion of new pistons or the reboring and new pistons are expensive and time-consuming operations.

The present invention relates to a piston that is capable of a limited amount of radial expansion to compensate for wear that may occur between the cylinder and piston walls. The radial expansion of the piston unit not only compensates for wear but insures complete contact between the piston and cylinder walls to maintain compression levels. The piston is comprised of four arcuate sections with a spring steel cylindrical insert mounted inside of the four segments to radially expand them. The length of the spring steel cylindrical insert insures that the radial pressure on each segment is exerted along its entire surface and not near one edge thereof to cause possible tilting of the piston segments.

It is therefore an object of this invention to provide a simple but unique piston assembly that provides for radial expansion thereof.

It is a further object of this invention to provide a piston assembly comprised of four equal arcuate sections radially expanded by a spring insert.

It is a further object of this invention to provide an expandable piston assembly whose radial pressure is exerted along the entire length of the piston walls.

It is a still further object of this invention to provide a radially expansible piston with a cylindrical spring steel insert to expand the segments of the piston.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a side elevational view of the piston in a cylinder.

FIG. 2 is an enlarged sectional view taken substantially along the line 2-2 of FIG. 1.

FIG. 3 is a top plan view of the piston in a cylinder with a portion of the piston broken away for clarity.

FIG. 4 is an exploded perspective view of the elements of the piston.

The numeral 10 generally designates the piston while numeral 12 indicates the wall assembly, numeral 14 the top of the piston, and 16 the spring steel cylindrical insert.

The wall assembly 12 of the piston is composed of two opposed pairs of arcuate-shaped members 18 and 20. The pair of arcuate members 18 accommodate the piston pin, and the pair of arcuate members 20 are the solid members mounted between the members 18. Each of the arcuate members 18 represents 90° of the circumference of the cylindrical wall assembly 12. The outside surface 22 is smooth over its entire length with a hole 24 extending through the member about mid-way between the top and bottom thereof. The hole 24 is designed to receive the piston pin therethrough and opens into a cylindrical boss 26 on the inner surface of the member 18. The arcuate members 18 have an abutment 28, of rectangular cross section, extending perpendicularly from the lower left and upper right, or opposed, corners of the member. There are corresponding rectangular cross section extending cutouts 30 at the upper left and lower right, or opposed, corners to receive the abutments of adjacent segments of the piston wall.

A groove 32 is cut around the arcuate inner surface of the members 18 immediately below the abutment 28 and cutout 30 of the upper edge. The groove 32 is rectangular in cross section and receives the top of the piston therein. A recess 34 is cut across the arcuate inner surface of the member 18 and extends from a point just below the groove 32 to the lower edge of the member where it terminates adjacent the abutment 28 and cutout 30 of the lower edge of the member. The recess 34 is adapted to receive the spring steel insert 16 therein. Thus, the pair of arcuate members 18 are mounted diametrically opposite one another on the circumference of the piston and accommodate the piston pin therebetween. A groove 36 is cut in the circumference of the hole 24 slightly inwardly from the outside surface 22 of the section 18 to receive a spring retainer washer 38 therein to provide for retaining the piston pin in place. Thus a piston pin 40 when journaled in the two cylindrical bosses 26 will be retained therein by the spring retainer washers 38 mounted in the grooves 36.

The opposed pair of arcuate members 20 are located diametrically opposite one another between the members 18. The members have the same smooth outer surface 42 as do the members 18. Similarly, the member 20 has rectangular extending abutments 44 of the same size and cross section as the abutments 28 on the members 18, at its lower left and upper right corners. Also, the members 20 have rectangularly extending cutouts 46, of the same size and cross section as the cutouts 30 in the members 18, at its upper left and lower right corners. A continuation 32' of the groove 32, is located immediately under the abutment 44 and cutout 46 at the top edge of the segments 20. Similarly, a continuation 34' of the recess 34 of the segments 18, are found on the inside surface of the segments 20. Thus, when the four segments 18, 18 and 20, 20 are brought together to form a cylinder the groove 32, 32' is continuous around the inner circumference thereof near the top, while the recess 34, 34' is continuous around the midsection of the cylinder. With the four arcuate sections thus brought together, the abutments 28 are received in the adjacent cutouts 46, and the abutments 44 are received in the adjacent cutouts 30, thereby forming an interlocked four section cylinder or wall assembly.

The top 14 of the piston assembly is a disc-shaped member 48 with a top surface 50 and a bottom surface 52. The disc 48 has a sidewall 54 which has a groove 56 cut therein to leave an outwardly extending ring portion 58 therearound. The thickness of the outwardly extending ring portion 58 is sized to fit within the groove 32 that is cut around the inner surface of the pairs of segments 18, 18 and 20, 20. Thereby, when the four arcuate segments are brought together to form a cylinder the top assembly 14 is received in interlocking engagement with the groove 32, 32' extending therearound. This interlocking of the top assembly with the arcuate segments lends further stability to the cylindrical structure along with the abutments 28 and 44 and the cutouts 30 and 46.

The spring steel cylindrical insert 16 has diametrically opposed holes 60 cut through the side thereof. The diameter of the holes 60 is slightly larger than the outside circumference of the cylindrical bosses 26 on the members 18 so as to be received thereover. Four rows of holes 62, with three holes in each row, extend longitudinally of the cylinder 16 spaced 90° around the circumference thereof. The rows of holes 62 then occur along the break line between the arcuate segments of the piston wall. The length of the cylindrical spring insert 16 is slightly smaller than the length of the recess 34 so as to be received therein. Thus, when the arcuate members 18, 18 and 20, 20 and the top section 14 are assembled into the piston around the spring steel insert 16, the spring is received within the recess 34, 34' thus imparting radially outward pressure as well as providing longitudinal stability between the adjacent arcuate sections. Thus, when all of the elements of the piston are assembled they form an interlocking unitary assembly that maintains its stability when inserted into the cylinder wherein it is to be used. A piston rod 64 has been shown installed on the piston pin 40 between the cylindrical bosses 26 of the opposed arcuate sections 18. Thus the complete piston assembly can be seen in FIGS. 1 and 2 in the environment in which it is to be used.

In addition to providing for the taking up of wear of the piston and cylinder walls, it can also be seen that the instant invention will also be beneficial in compensating for the contraction and expansion of the cylinder and piston walls. Normally, in a cold engine the piston has contracted to a point where the gap between it and the cylinder walls is such that some compression is lost and the volume compressed in the area above the piston can leak therepast.

The invention as set forth herein, is a simple but unique and practical solution to the problems normally associated with machines utilizing pistons moving within cylinders. The radial expansion of the piston, due to the elongated cylindrical spring insert, is uniform along the entire length of the arcuate segments of the piston thereby insuring against tilting of the piston or its segments within the cylinder. Similarly, the interlocking of the abutments and cutouts on the arcuate segments, and the receiving of the spring insert into the recesses of the arcuate segment lends great stability to the piston formed thereby. The piston is a versatile unit and can find utility in both internal combustion engines and compressors.

I claim:

1. An expandable piston, comprising: a plurality of arcuate wall sections, a top section, resilient means to urge said wall sections radially outward, said resilient means comprising a cylindrical spring extending along the inner surface of said arcuate sections, said arcuate sections having a continuous recess extending on the inner surface therearound which is of substantially the length of the cylindrical spring to receive the spring therein.

2. The device of claim 1 wherein there are four arcuate wall sections each being a 9o° F. segment of a circle.

3. The device of claim 2 wherein a pair of diametrically opposite arcuate sections have a cylindrical boss on the inner surface thereof with openings therethrough defining an axis of rotation perpendicular to the longitudinal axis of the piston.

4. The device of claim 1 wherein said top section is a disc-shaped member with a radially outwardly extending abutment around the sidewall thereof adjacent the top surface of the section.

5. The device of claim 4 wherein said radial abutment is received in a continuous groove on the inner surface of the arcuate sections adjacent the top thereof.

6. An expandable piston including an upright cylindrical wall assembly and a top section supported from and closing the upper end of the cylindrical wall assembly, said wall assembly comprising a plurality of circumferentially spaced partial cylindrical wall sections, and a cylindrical spring extending along the inner surfaces of said sections, said cylindrical spring extending axially along said wall assembly at least one half the distance between said top section and the lower end of said cylindrical wall assembly.

7. The combination of claim 6 wherein said partial cylindrical wall sections equal four in number and comprise two pairs of diametrically opposite quarter cylindrical sections.

8. The combination of claim 7 wherein one pair of said sections include inwardly projecting and aligned cylindrical piston pin bosses extending radially of said cylindrical wall assembly and spaced below said top section, said cylindrical spring having diametrically aligned openings formed therein intermediate its opposite ends through which said bosses project.

9. The combination of claim 6 wherein said cylindrical spring extends axially of said wall assembly substantially the entire distance between said top section and the lower end of said wall assembly.